June 26, 1962     S. P. WILLITS     3,041,501
ELECTRICAL ENERGY STORAGE DEVICE
Filed April 3, 1959
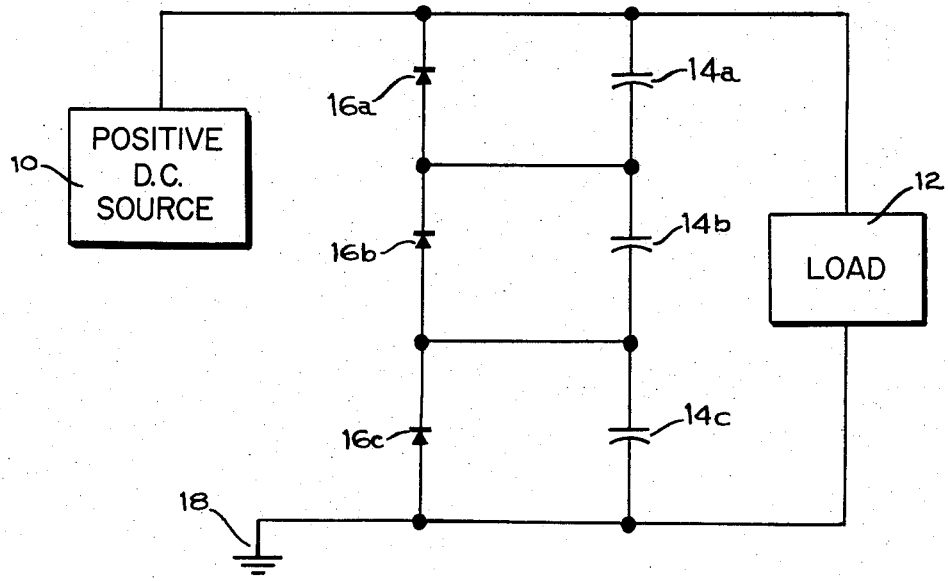
SAMUEL P. WILLITS
INVENTOR.
BY *Jacques L. Meister*
AGENT.

United States Patent Office 3,041,501
Patented June 26, 1962

3,041,501
ELECTRICAL ENERGY STORAGE DEVICE

Samuel P. Willits, Mount Prospect, Ill., assignor to Chicago Aerial Industries, Inc., Melrose Park, Ill., a corporation of Delaware
Filed Apr. 3, 1959, Ser. No. 803,870
6 Claims. (Cl. 315—205)

My invention relates in general to electrical energy storage devices which are characterized by high outputs of short duration and in particular to improved circuitry for such storage devices.

In one specific aspect my invention relates to circuitry comprised of electrolytic capacitors connected in series, each having an individual Zener diode.

One common method of supplying large pulses of electrical energy at high potential employs capacitors, either singly or combined as by connecting in series. Oil-and-paper capacitors providing this type of service are large and heavy, thereby being inappropriate for use where a portable unit is required. On the other hand, electrolytic capacitors which are comparatively light in weight have not heretofore been amenable to arrangement in units supplying energy at much above 500 volts. Furthermore, there has been considerable power loss at the dividing resistors which were previously required to distribute evenly the charging voltage. An additional difficulty associated with the use of electrolytic capacitors, particularly with respect to arrangements in series, resides in preventing the impression of a large reverse voltage across any given capacitor and concomitant damage to its electrolytic film during discharge of the unit.

Therefore, my invention takes as a general object the provision of a new and improved electrical energy storage device which is suitable for use where lightness of weight is a factor.

A further object of my invention is the provision of a circuit for electrolytic capacitors which evenly distributes the charging voltage with essentially no power loss.

A still further object of my invention is the provision of a circuit for electrolytic capacitors which protects the electrolytic films thereof by limiting, to a small value, the reverse voltage appearing across any completely discharged capacitor during discharge of the unit.

Other objects will become apparent from the following descriptions given with reference to the appended drawing.

In the drawing:

The drawing is a schematic circuit diagram, partially in block form, of one embodiment of an electrical energy storage device in accordance with the principles of my invention.

Referring now in detail to the drawing, the drawing shows a positive D.C. source 10. Source 10 is arranged and constructed to have an output voltage and impedance such that the output current permits the desired length of charging time while not exceeding the range of values suitable for use with Zener type diodes. In one illustrative embodiment utilizing three 450 volt Zener diodes, applicant has employed a D.C. source with a 1,500 volt output and a 15,000 ohm source impedance. In order to supply large pulses of electrical energy to load 12 at high potential, several electrolytic capacitors shown as 14a, 14b, and 14c are connected in series as shown, parallel with the load 12. It is understood that each of the several capacitors, such as 14a, may be comprised of a parallel arrangement of separate capacitors. The several capacitors are properly arranged with source 10 and load 12 so as to give due consideration to the polarization inherent in the capacitors.

At least two capacitors are used in order to distribute the voltage of source 10, the upper limit in the number of capacitors employed being dictated in part by the load characteristics in each given situation and in part by ability to insulate the circuit. Load 12 is desirably provided with self-contained switching or initiating means and may take the form of, for example, an electronic flash tube unit, for use with which my invention is particularly well suited.

As is known to those versed in the electrical arts, electrolytic capacitors are susceptible to damage, especially of the electrolytic film, by an impressed voltage opposite to the inherent polarity of the capacitor. Furthermore, since commercial manufacture permits some variation in the capacitance of nominally equivalent capacitors, series connection of such capacitors can, upon discharge, permit a reverse voltage to develop across the first discharged unit. Therefore, provision must be made to limit the reverse voltage to some small, safe value.

A unique feature of my invention resides in providing shunting Zener diodes, shown as 16a, 16b, and 16c for limiting the reverse voltage impressible across any one of the electrolytic capacitors. The preferred arrangement embodies electrolytic capacitors each having an individual Zener diode connected as shown in the figure. This arrangement ensures limiting the reverse voltage, as well as providing voltage dividing characteristics upon charging.

An additional feature of my invention can be found in the small power loss on charging, there being essentially no dissipation of power in the Zener diodes until the Zener voltage is reached.

Thus, when the positive potential from source 10 is impressed on the capacitors 14a, 14b, and 14c, the Zener diodes 16a, 16b, and 16c serve to divide the potential in a substantially even manner among the several capacitors. Specifically, whenever the voltage across a given capacitor reaches the Zener voltage of the shunting diode, the diode breaks down to form a conducting path around the capacitor, thereby limiting the charging voltage to the value of the Zener voltage. Similarly, whenever the self-contained switching means in load 12 initiates discharge, the Zener diodes provide a conducting path around first discharged capacitors after the small forward voltage of the diodes has been exceeded, thereby limiting the reverse voltage impressed on the respective capacitors to a small value. Discharge of the capacitors through the load 12 to the source of ground potential 18 provides the necessary electrical energy for the operation of load 12.

What I claim is:

1. An electrical energy storage device comprised of: a source of high voltage D.C. potential; a plurality of electrolytic capacitors connected in series with said source of D.C. potential for storing energy received from said source; a plurality of Zener diodes connected with said capacitors and adapted to provide an individual shunting Zener diode for each of said capacitors; and a load electrically connected to said capacitors for periodically employing the energy stored therein.

2. An electrical energy storage device comprised of: a source of high voltage D.C. potential; a plurality of electrolytic capacitors connected in series with said source of D.C. potential for storing energy received from said source; a plurality of Zener diodes connected with said capacitors and adapted to provide an individual shunting Zener diode for each of said capacitors; and a load, including an electronic flash tube, electrically connected to said capacitors for periodically employing the energy stored therein.

3. A circuit for electrolytic capacitors comprising: a plurality of electrolytic capacitors connected in series; and Zener diode means connected in series parallel with said capacitors and adapted to distribute charging voltage to said capacitors.

4. A circuit for electrolytic capacitors comprising: a plurality of electrolytic capacitors connected in series; and Zener diode means connected in series parallel with said capacitors and adapted to distribute charging voltage to said capacitors and to minimize reverse voltage across said capacitors.

5. A circuit for electrolytic capacitors comprising: a plurality of electrolytic capacitors connected in series; and a plurality of Zener diodes connected with said capacitors and adapted to provide an individual shunting Zener diode for each of said capacitors, to distribute charging voltage to said capacitors, and to minimize reverse voltage across said capacitors.

6. In an electronic flash tube system, the improvement comprising: a plurality of electrolytic capacitors for periodically supplying high voltage electrical energy to the electronic flash tube of said electronic flash tube system; and a voltage divider network, including a plurality of Zener diodes, connected with said capacitors and adapted to provide an individual shunting Zener diode for each of said capacitors.

References Cited in the file of this patent

UNITED STATES PATENTS

| | | |
|---|---|---|
| 2,310,092 | Knowles et al. | Feb. 2, 1943 |
| 2,431,151 | Tellegen | Nov. 18, 1947 |
| 2,495,301 | Wengel | Jan. 24, 1950 |
| 2,589,720 | McMath | Mar. 18, 1952 |
| 2,789,254 | Bodle et al. | Apr. 16, 1957 |
| 2,819,442 | Goodrich | Jan. 7, 1958 |
| 2,840,763 | Rambo et al. | June 24, 1958 |
| 2,843,745 | Smith | July 15, 1958 |